(12) United States Patent
Ochi

(10) Patent No.: US 6,796,348 B2
(45) Date of Patent: Sep. 28, 2004

(54) PNEUMATIC TIRE INCLUDING BLOCKS HAVING REINFORCING PORTIONS

(75) Inventor: Naoya Ochi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 90 days.

(21) Appl. No.: 09/906,836

(22) Filed: Jul. 18, 2001

(65) Prior Publication Data

US 2002/0026972 A1 Mar. 7, 2002

(30) Foreign Application Priority Data

Jul. 18, 2000  (JP) .......................... 2000-217669

(51) Int. Cl.[7] ................. B60C 11/11; B60C 107/00; B60C 121/00
(52) U.S. Cl. .................. 152/209.15; 152/209.18; 152/902
(58) Field of Search .............. 152/209.15, 209.18, 152/902

(56) References Cited

U.S. PATENT DOCUMENTS

| | | | | |
|---|---|---|---|---|
| 4,690,189 A | * | 9/1987 | Bradisse et al. | |
| 4,779,656 A | * | 10/1988 | Graas | |
| 4,815,511 A | * | 3/1989 | Brayer et al. | |
| 6,129,127 A | * | 10/2000 | Nicotina | |
| 2002/0062892 A1 | * | 5/2002 | Himura | |

FOREIGN PATENT DOCUMENTS

| | | | |
|---|---|---|---|
| DE | 43 26 036 A1 | 2/1995 | |
| EP | 0 812 709 A1 | 12/1997 | |
| EP | 0 925 957 A2 | 6/1999 | |
| EP | 1 106 391 A2 | 6/2001 | |
| GB | 1549347 | * | 8/1979 |
| JP | 2-179508 | * | 7/1990 |
| JP | 2000-247111 | * | 9/2000 |

* cited by examiner

*Primary Examiner*—Steven D. Maki
(74) *Attorney, Agent, or Firm*—Sughrue Mion, PLLC (57) ABSTRACT

A pneumatic tire is provided in which hydroplaning performance, transverse slipping performance on snow, straight forward traveling stability, and the like are maintained by a pair of circumferential grooves. A large number of second blocks and center blocks are formed, by a large number of transverse grooves, in a center tread region positioned between the pair of circumferential grooves. A reinforcing portion is provided at the center block. This reinforcing portion faces, in a circumferential direction, the second block with a narrow transverse groove therebetween. Another reinforcing portion is provided at an end portion of the second block. This reinforcing portion faces, in the circumferential direction, the center block with a narrow transverse groove therebetween. Each block is reinforced by the reinforcing portion provided integrally therewith. When a block receives load in a direction of deformation, the block abuts and is supported by the reinforcing portion of a block adjacent thereto. Thus, even if a number of transverse grooves is increased, deformation is suppressed. Accordingly, good off-road performance, on-snow performance, and on-road traveling performance can be obtained.

22 Claims, 5 Drawing Sheets

PNEUMATIC TIRE INCLUDING BLOCKS HAVING REINFORCING PORTIONS

BACKGROUND OF THE INVENTION

1. Field of the Invention

The present invention relates to a pneumatic tire, and in particular, to a pneumatic tire having a block pattern which can provide good off-road performance, on-snow performance, and on-road traveling performance.

2. Description of the Related Art

Figure 5:
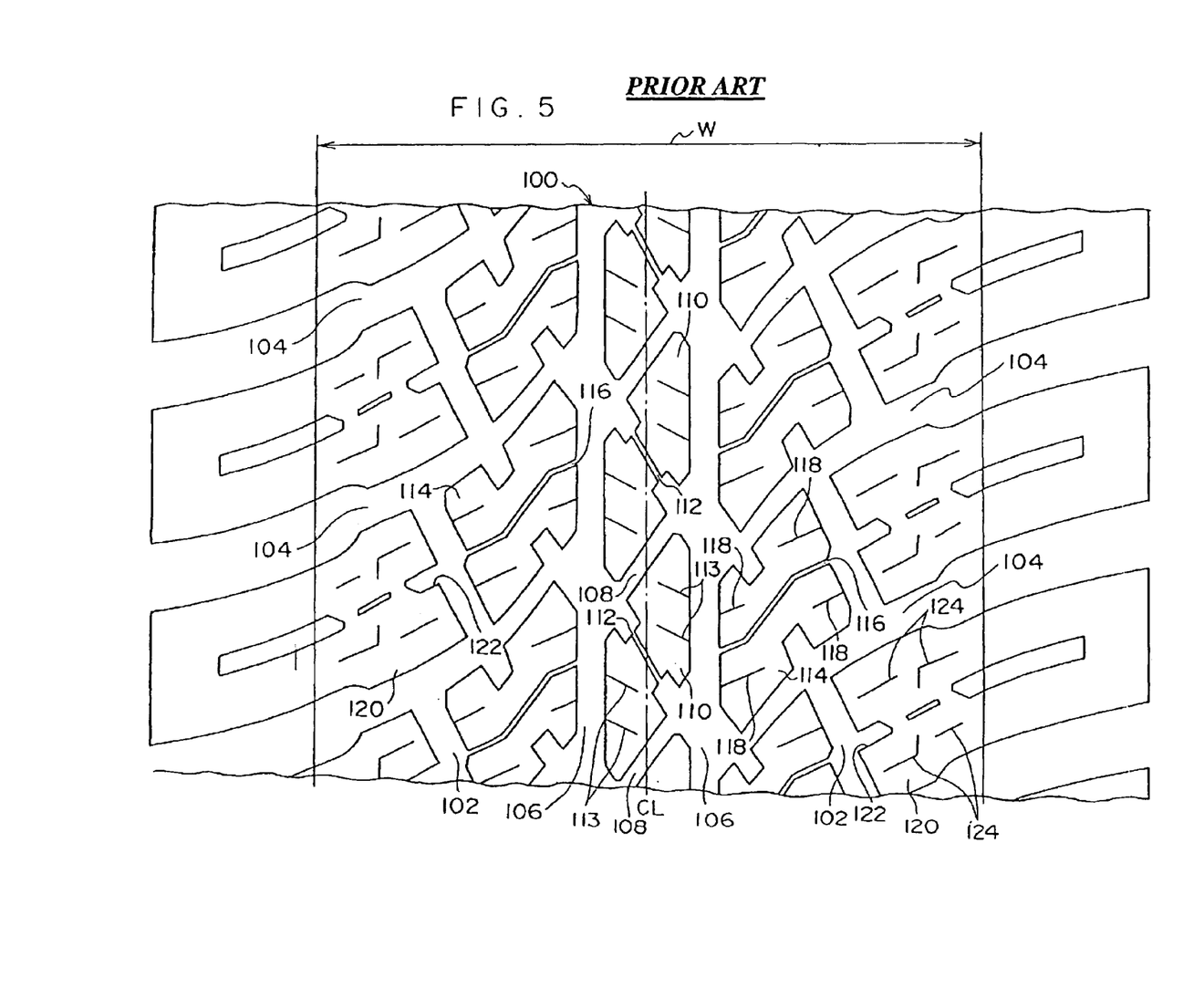
FIG. 5 is a plan view of a tread of a conventional pneumatic tire.

As shown in FIG. 5, in order to improve off-road traveling performance, tires for passenger and four-wheel drive vehicles generally employ a block pattern structure in which a tread 100 has circumferential grooves 102 which extend in zigzags in the circumferential direction of the tire in order to increase the number of the longitudinal and lateral edge factor, and has transverse grooves 104 which extend in the tire axial direction from the vertices or the sides of these zigzags.

To describe this tread pattern in more detail, the tread 100 is provided with a pair of circumferential grooves 106 which are formed parallel to a tire equatorial plane CL between the pair of circumferential grooves 102, and which are formed linearly and have constant widths.

A large number of transverse grooves 108, which are inclined with respect to the circumferential direction of the tire, are formed, substantially in the circumferential direction of the tire, at the region between the pair of circumferential grooves 106. Further, a plurality of center blocks 110 are formed thereby.

An auxiliary groove 112, which is narrow and is inclined in the direction opposite to the transverse grooves 108, is formed in the center block 110 such that two sub-blocks are formed. Further, a plurality of sipes 113 are formed in the center block 110.

A plurality of second blocks 114 are formed in the region between the circumferential groove 102 and the circumferential groove 106. An auxiliary groove 116, which is narrow and is inclined in the same direction as the transverse grooves 104, is formed in the second block 114, so as to form two sub-blocks. A plurality of sipes 118 are formed in the second block 114.

A large number of shoulder blocks 120 are formed at the outer sides of the circumferential grooves 102 in the widthwise direction of the tire. An auxiliary groove 122, which is inclined in the same direction as the transverse grooves 104, and a plurality of sipes 124 are formed in the shoulder block 120.

The transverse grooves 108 and the transverse grooves 104 at the left and right sides are inclined upwardly toward the right. Further, the center blocks 110, the second blocks 114, and the shoulder blocks 120 are disposed such that adjacent blocks have a phase difference in the circumferential direction of the tire therebetween.

Note that W in the drawings denotes the ground contact width.

In this type of pneumatic tire, in order to improve the on-road traveling performance, the rigidity is increased and the performances are maintained by making the blocks larger and by ensuring, with the negative ratio being 45% or less, the sufficient ground contact surface.

When the tread surface of the tread 100 is divided into a center tread region, which is located between the (two) circumferential grooves 102, and side tread regions, which are positioned at the outer sides of the center tread region in the widthwise direction, the pitch number ratio of the blocks of the center tread region and the both side tread regions is set to be 1:1.

In a conventional pneumatic tire such as that shown in FIG. 5, usually, in order to ensure the off-road and on-snow performances, a large number of longitudinal and lateral edge factor (sipes and the like) are formed in the tread.

However, an increase in the number of edge factor in the block leads to a decrease in block rigidity and relates to a deterioration in on-road performances.

Thus, in order to prevent the rigidity from decreasing, there are many cases in which the block is set to be large. However, when the blocks at the side tread regions of the tread surface are large, a problem arises in that pattern noise becomes markedly worse.

In recent years, as vehicles have become more high-power, the need has arisen for tires to exhibit even higher levels of on-road and off-road performances.

Figure 6:
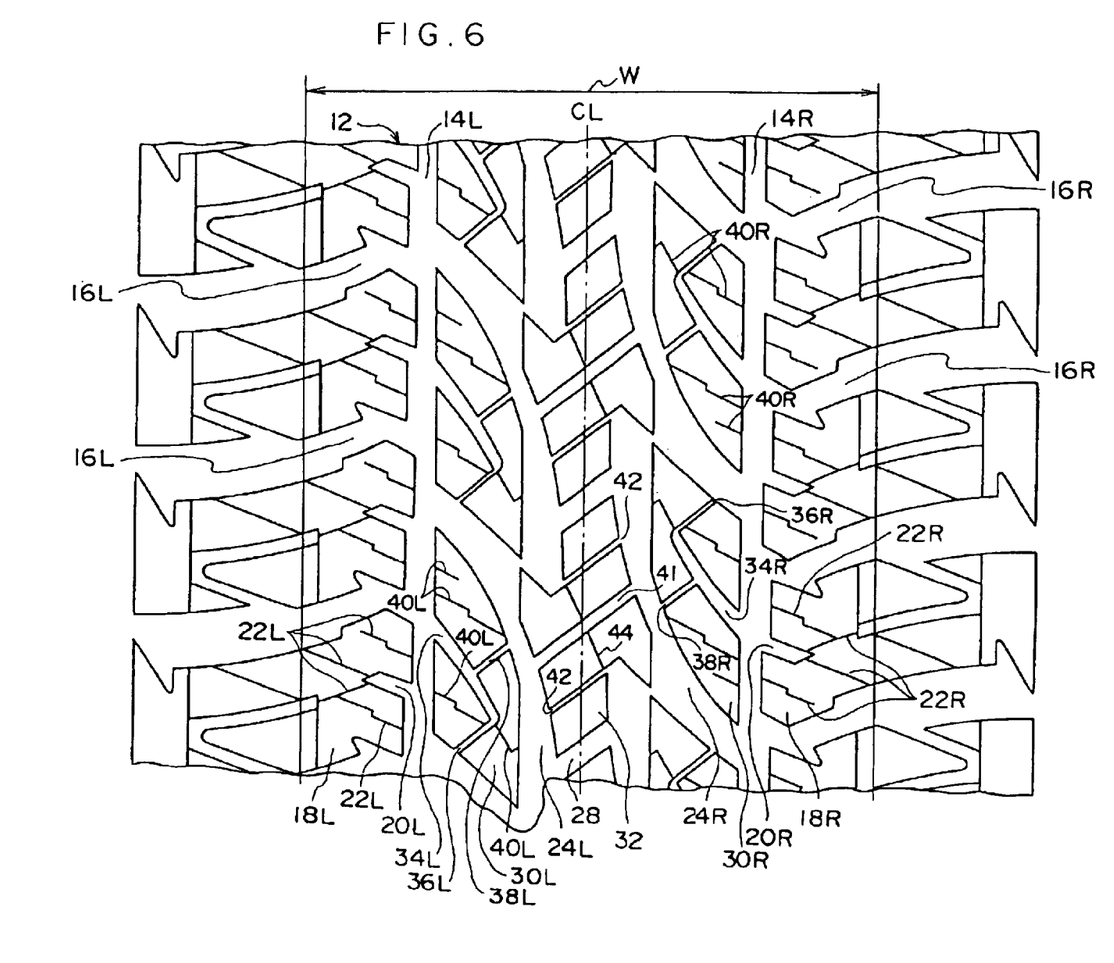
FIG. 6 is a plan view of a tread of a pneumatic tire relating to a comparative example.

Thus, a pneumatic tire having the tread pattern shown in FIG. 6 was conceived as an improvement on the traveling properties of the pneumatic tire having the tread pattern shown in FIG. 5.

In the tread pattern shown in FIG. 6, reference numeral 12 is a tread; 14L, 14R are circumferential grooves; 16L, 16R, 24L, 24R, and 28 are transverse grooves; 18L, 18R are shoulder blocks; 34L, 34R, 36L, 36R, 38L, 38R, 41 and 42 are auxiliary grooves; 30L, 30R are second blocks; 32 is a center block; 22L, 22R, 40L, 40R and 44 are sipes; and W is the ground contact width.

The feature of the pattern shown in FIG. 6 is that the number of transverse groove components is greater than in the pattern shown in FIG. 5. Note that the center blocks 32 and the second blocks 30 have absolutely no portions which overlap in the tire axial direction when viewed in the circumferential direction of the tire.

The pneumatic tire having the tread pattern shown in FIG. 6 does exhibit an improvement in performances as compared to the pneumatic tire having the tread pattern of FIG. 5, but the improvement is still insufficient.

SUMMARY OF THE INVENTION

In view of the aforementioned, an object of the present invention is to provide a pneumatic tire having a block pattern which can provide, in particular, good off-road performance, on-snow performance, and on-road traveling performance, altogether.

A first aspect of the present invention is a pneumatic tire comprising: a circumferential groove extending along a circumferential direction of the tire, and provided within a region which is 10 to 40% of a ground contact width from one ground contact end of a tread in the widthwise direction toward a tire equatorial plane; another circumferential groove extending along the circumferential direction of the tire, and provided within a region which is 10 to 40% of the ground contact width from another ground contact end of the tread in the widthwise direction toward the tire equatorial plane; at least two rows of blocks which, when a region between the pair of circumferential grooves is defined as a center tread region, are divided, in at least the center tread region, by a plurality of transverse grooves extending substantially in a tire axial direction; first reinforcing portions provided integrally with tire-widthwise-direction other side end portions of first blocks located at tire-widthwisedirection one side among the at least two rows of blocks, such that the first reinforcing portions are connected to block side surfaces of the first block and adjacent transverse groove bottom portions; and second reinforcing portions provided integrally with tire-widthwise-direction one side end portions of second blocks located at the tire-widthwise direction other side which are adjacent to the first blocks, such that the second reinforcing portions are connected to block side surfaces of the second block and adjacent transverse groove bottom portions, wherein at least a portion of each first reinforcing portion faces the second block with the transverse groove therebetween in the circumferential direction of the tire and overlaps the second block in the tire widthwise direction; at least a portion of each second reinforcing portion faces the first block with the transverse groove therebetween in the circumferential direction of the tire and overlaps the first block in the tire widthwise direction; and a height of the first reinforcing portion decreases as the first reinforcing portion is distanced from the first block, and a height of the second reinforcing portion decreases as the second reinforcing portion is distanced from the second block.

In accordance with the above-described first aspect, the following excellent effects are achieved.

(1) Because the pair of circumferential grooves is provided in the tread, performance on snow preventing the side slip, the straight forward traveling stability, the hydroplaning performance on wet road surfaces, and the like can be ensured.

(2) A plurality of blocks are formed by the transverse grooves (which may be parallel to or inclined with respect to the tire axial direction) at least at the center tread region. Thus, the basic performances required of a tire for four wheel drive (traveling on rough roads, traveling on ice and snow, and the like) can be ensured.

(3) Because at least two block rows are provided in the center tread region, cornering performance at the time of traveling off-road and at the time of traveling on snow can be ensured.

(4) In a case in which the number of transverse grooves is increased in order to improve the on-snow performances (such as traction or the like), the volume of the block decreases such that the rigidity of the block decreases, and it may be easy for the block to deform. However, in accordance with the present aspect, when a load which could deform the block in the circumferential direction of the tire (in the conventional tire) is applied to the block, the reinforcing portion provided at that block markedly suppresses the deformation of the block. Further, even if the block is on the verge of deformation, that block abuts against and is supported by the reinforcing portion of a block adjacent thereto at the deformation side. Thus, deformation of the block can effectively be suppressed.

Accordingly, while deformation of blocks is effectively suppressed, the number of transverse grooves can be made greater than in the conventional art, and thus, the on-snow performance is markedly improved.

(5) The height of the reinforcing portion decreases as the reinforcing portion is distanced from the block. Thus, when the blocks become worn due to traveling, the edge factor of the blocks gradually increases. Accordingly, a deterioration in the on-snow performances and off-road performances, which deterioration accompanies a decrease in the groove volume of the circumferential grooves and the transverse grooves due to wear, is suppressed. Thus, there is little change in the performances from the time the tire is a new product until the final stages of wear.

(6) Because the reinforcing portions are provided at the end portions of the blocks, as compared with blocks at which no reinforcing portions are provided, the block rigidity at the time the tire is new is high, and the stability and maneuvability on paved roads is improved.

In a second aspect of the present invention, all portions of the first reinforcing portion face the second block with the transverse groove therebetween in the circumferential direction of the tire and overlap the second block in the tire widthwise direction, and all portions of the second reinforcing portion face the first block with the transverse groove therebetween in the circumferential direction of the tire and overlap the first block in the tire widthwise direction.

In accordance with the second aspect, the effect of suppressing deformation of the block is greater than in a case in which (only) a portion of the reinforcing portion faces, in the circumferential direction, the adjacent block.

In a third aspect of the present invention, the height of the first reinforcing portion decreases at a constant rate as the first reinforcing portion is distanced from the first block, and the height of the second reinforcing portion decreases at a constant rate as the second reinforcing portion is distanced from the second block.

In accordance with the third aspect, the height of the reinforcing portion decreases at a constant rate as the reinforcing portion is distanced from the block. Thus, the edge factor can be increased at a constant rate as wear of the block proceeds.

In a fourth aspect of the present invention, the pneumatic tire further comprises center blocks located at the center in the widthwise direction of the tire, and left and right (hand-side) second blocks provided at outer sides of the center blocks in the widthwise direction of the tire, the center blocks, the left second blocks and the right second blocks being provided in three rows at the center tread region, wherein a reinforcing portion, provided at an end portion of each second block at the equatorial plane side in the widthwise direction of the tire, faces the center block with the transverse groove therebetween in the circumferential direction of the tire and overlaps the center block in the tire widthwise direction, and a reinforcing portion, provided at end portions of the center block at the outer sides thereof in the widthwise direction of the tire, faces the second block with the transverse groove therebetween in the circumferential direction of the tire and overlaps the second block in the tire widthwise direction.

In accordance with the fourth aspect, by making the center tread region into three rows of blocks, at least one row of blocks can be disposed on the tire equatorial plane. Thus, the on-road traveling performances (on-road feeling and sense of rigidity) are improved.

Further, at the center tread region, the number of transverse grooves is greater than in a case in which there are two rows of blocks. Thus, traction and braking performance on snow can be improved.

At each of the blocks of the center tread region, when the block receives a load in a direction of deforming the block (along the circumferential direction of the tire), the deformation is markedly suppressed by the operation of the reinforcing portion.

In a fifth aspect of the present invention, the widths of the transverse grooves between the reinforcing portions and the blocks facing the reinforcing portions in the circumferential direction are more narrow than the widths of the other transverse grooves.

In accordance with the fifth aspect, even if the amount of deformation of the block is relatively small, the block can abut the reinforcing portion, and thus, the amount of deformation of the block can reliably be kept small.

For example, when a large force in the tire longitudinal direction is applied at the time of braking or traction or the like, the blocks support one another, which contributes to an improvement in the rigidity of the tread.

In a sixth aspect of the present invention, the groove widths of the transverse grooves between the reinforcing portions and the blocks facing the reinforcing portions in the circumferential direction are set in the range of 0.5 to 4 mm.

In accordance with the sixth aspect, the effect of providing the reinforcing portions can reliably be obtained while a deterioration in performances on wet roads is suppressed.

In a seventh aspect of the present invention, the reinforcing portion has an inclined surface whose angle, with respect to a line normal to the tread surface of the block, is set within a range of 10 to 70°. It is more preferable that the angle of the inclined surface of the reinforcing portion, with respect to the line normal to the tread surface of the block, is set within a range of 15 to 65°.

In accordance with the seventh aspect, the effect of providing the reinforcing portions can reliably be obtained while the disadvantage caused by a decrease in groove volume is suppressed.

DESCRIPTION OF THE PREFERRED EMBODIMENTS

Hereinafter, an example of an embodiment of the present invention will be described in detail with reference to the drawings.

Figure 1:
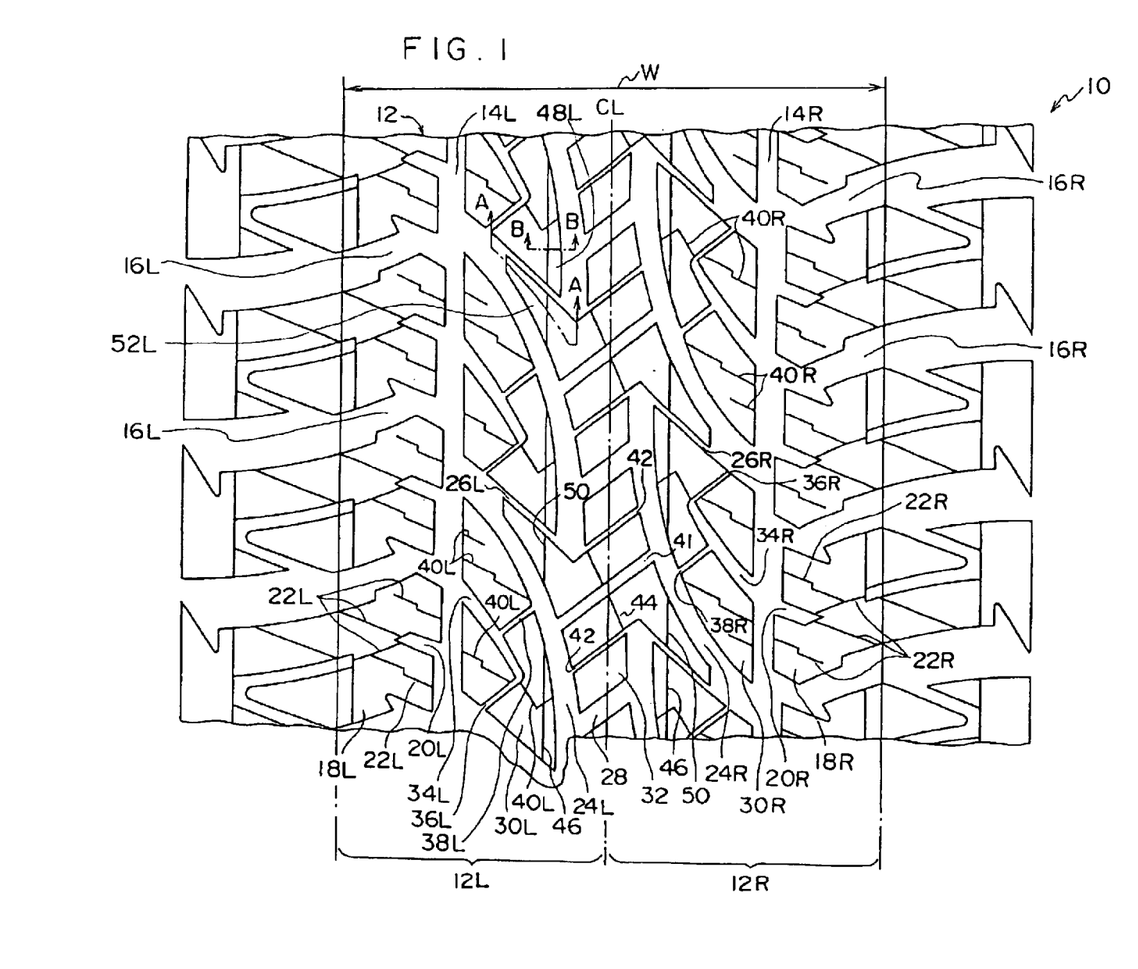
FIG. 1 is a plan view of a tread of a pneumatic tire relating to an embodiment of the present invention.

As shown in FIG. 1, at a tread 12 of a pneumatic tire 10 (tire size: 265/70R16) of the present embodiment, a pair of circumferential grooves 14 are provided at the outer sides of a tire equatorial plane CL in the widthwise direction of the tire.

The circumferential grooves 14 are provided so as to extend linearly in the circumferential direction of the tire and so as to be parallel to the circumferential direction of the tire.

In the present embodiment, hereinafter, the region between a circumferential groove 14L and a circumferential groove 14R of the tread 12 is called the center tread region, the region at the outer side of the circumferential groove 14L in the widthwise direction of the tire is called the left side tread region, the region at the outer side of the circumferential groove 14R in the widthwise direction of the tire is called the right side tread region, and the left side tread region and the right side tread region are together called the both side tread regions.

Note that the letter W in the drawings denotes the ground contact width. The ground contact width is, in accordance with the 2000 JATMA Year Book, the maximum width in the tire widthwise direction of a portion contacting a road surface at the time when the pneumatic tire 10 is mounted to a standard rim, with the maximum load capacity at the size/ply rating and the air pressure corresponding thereto (maximum air pressure) used as a reference. When TRA standard or ETRTO standard is applied at the geographical regions of use or manufacture of the tire, the required standard is used.

Both Side Tread Regions

A plurality of transverse grooves 16L are provided along the circumferential direction of the tire at the left side tread region 12L of the ground contact region. The transverse groove 16L extends toward the outer side, in the widthwise direction, from the circumferential groove 14L, and is inclined (upwardly toward the right in the present embodiment) at a relatively large angle with respect to the circumferential direction of the tire. By providing the transverse grooves 16L, a large number of shoulder blocks 18L are formed.

An auxiliary groove 20L and sipes 22L are formed in the shoulder block 18L. The auxiliary groove 20L is more narrow than the adjacent transverse groove 16L. (The auxiliary groove 20L is of a width such that, even when the shoulder block 18L contacts the ground and is compressed, the auxiliary groove 20L retains the form of a groove and the water draining property thereof is maintained.) The auxiliary groove 20L extends toward the outer side in the widthwise direction of the tire from the circumferential groove 14L. Note that the auxiliary groove 20L ends within the shoulder block 18L.

On the other hand, a plurality of transverse grooves 16R are provided along the circumferential direction of the tire at a ground contact region right side tread region 12R. The transverse groove 16R extends toward the outer side from the circumferential groove 14R in the widthwise direction of the tire, and is inclined (upwardly toward the right in the present embodiment) at a relatively large angle with respect to the circumferential direction of the tire. By providing the transverse grooves 16R, a large number of shoulder blocks 18R are formed. An auxiliary groove 20R and sipes 22R are formed in the shoulder block 18R. The auxiliary groove 20R is more narrow than the adjacent transverse groove 16R. (The auxiliary groove 20R is of a width such that, even when the shoulder block 18R contacts the ground and is compressed, the auxiliary groove 20R retains the form of a groove and the water draining property thereof is maintained.) The auxiliary groove 20R extends toward the outer side in the widthwise direction of the tire from the circumferential groove 14R. Note that the auxiliary groove 20R ends within the shoulder block 18R.

(Center Tread Region)

In the center tread region are provided: rightward falling transverse grooves 24L which extend so as to curve toward the tire equatorial plane CL from the circumferential groove 14L; rightward falling transverse grooves 26L which are disposed between the transverse groove 24L and the transverse groove 24L, and which extend substantially linearly from the circumferential groove 14L toward the tire equatorial plane CL, and which are connected with the transverse grooves 24L; leftward rising transverse grooves 24R which extend from the circumferential groove 14R toward the tire equatorial plane CL; leftward rising transverse grooves 26R which are disposed between the transverse groove 24R and the transverse groove 24R, and which extend substantially linearly from the circumferential groove 14R toward the tire equatorial plane CL, and which are connected with the transverse grooves 24R; and rightward rising transverse grooves 28 which connect the transverse grooves 24L and the transverse grooves 24R.

At the center tread region, due to the transverse grooves 24L, the transverse grooves 24R, the transverse grooves 26L, the transverse grooves 26R and the transverse grooves 28, a plurality of second blocks 30L are formed at the side of the circumferential groove 14L, a plurality of second blocks 30R are formed at the side of the circumferential groove 14R, and a plurality of center blocks 32 are formed on the tire equatorial plane CL.

The transverse groove 24L and the transverse groove 24R bend in substantial arc shapes whose tire equatorial plane CL sides are convex, such that the angle of the transverse groove 24L and the transverse groove 24R with respect to the circumferential direction of the tire gradually increases from the tire equatorial plane CL side toward the outer side in the widthwise direction of the tire. The transverse groove 24L and the transverse groove 24R are disposed so as to have a phase difference in the circumferential direction of the tire. In this way, the second block 30L and the second block 30R have point-symmetrical configurations which have point symmetry around one point on the tire equatorial plane CL.

The second blocks 30L, 30R of the present embodiment are substantially fan-shaped.

An auxiliary groove 34L, an auxiliary groove 36L, and an auxiliary groove 38L are formed in the second block 30L, and are each more narrow than the adjacent transverse groove 24L (i.e., each have a width such that, even when the second block 30L contacts the ground and is compressed, the auxiliary grooves 34L, 36L, 38L retains the form of a groove and the water draining properties thereof are maintained).

The auxiliary groove 34L extends from the circumferential groove 14L toward the tire equatorial plane CL, and is inclined in the same direction as the adjacent transverse grooves 24L, 26L. Note that the auxiliary groove 34L ends within the block.

The auxiliary groove 36L and the auxiliary groove 38L are inclined in the direction opposite, with respect to the circumferential direction, to the direction of inclination of the auxiliary groove 34L, and are connected to the transverse groove 26L and the transverse groove 24L. The auxiliary groove 34L, the auxiliary groove 36L, and the auxiliary groove 38L divide the second block 30L into three sub-blocks.

Note that sipes 40L are formed in the respective sub-blocks of the second block 30L.

An auxiliary groove 34R, an auxiliary groove 36R, and an auxiliary groove 38R are formed in the second block 30R, and are each more narrow than the adjacent transverse groove 24R (i.e., each have a width such that, even when the second block 30R contacts the ground and is compressed, the auxiliary grooves 34R, 36R, 38R retains the form of a groove and the water draining properties thereof are maintained).

The auxiliary groove 34R extends from the circumferential groove 14R toward the tire equatorial plane CL, and is inclined in the same direction as the adjacent transverse grooves 24R, 26R. Note that the auxiliary groove 34R ends within the block.

The auxiliary groove 36R and the auxiliary groove 38R are inclined in the direction opposite, with respect to the circumferential direction, to the direction of inclination of the auxiliary groove 34R, and are connected to the transverse groove 26R and the transverse groove 24R. The auxiliary groove 34R, the auxiliary groove 36R, and the auxiliary groove 38R divide the second block 30R into three sub-blocks.

Note that sipes 40R are formed in the respective sub-blocks of the second block 30R.

The center blocks 32 are defined by two transverse grooves 24L, two transverse grooves 24R, two transverse grooves 28, the transverse groove 26L and the transverse groove 26R. The portion between the transverse groove 24L and the transverse groove 26L, and the portion between the transverse groove 24R and the transverse groove 26R are formed such that the widths thereof become narrower toward the outer sides in the widthwise direction of the tire.

The center block 32 is divided into three portions in the circumferential direction of the tire by an auxiliary groove 41, which is formed in the central portion of the center block 32 in the circumferential direction of the tire, and auxiliary grooves 42, which is formed at both sides of the auxiliary groove 41. The auxiliary groove 41 is inclined in the same direction as the adjacent transverse groove 28 and is narrow. (However, the auxiliary groove 41 has a width such that, even when the center block 32 contacts the ground and is compressed, the auxiliary groove 41 retains the form of a groove and the water draining property thereof is maintained.) The auxiliary grooves 42 are similarly inclined in the same direction as the adjacent transverse groove 28, and are set to be more narrow than the auxiliary groove 41. A sipe 44, which is inclined in the direction opposite to the auxiliary groove 41, is formed in the central portion of the center block 32.

(Reinforcing Portion)

Figure 2:
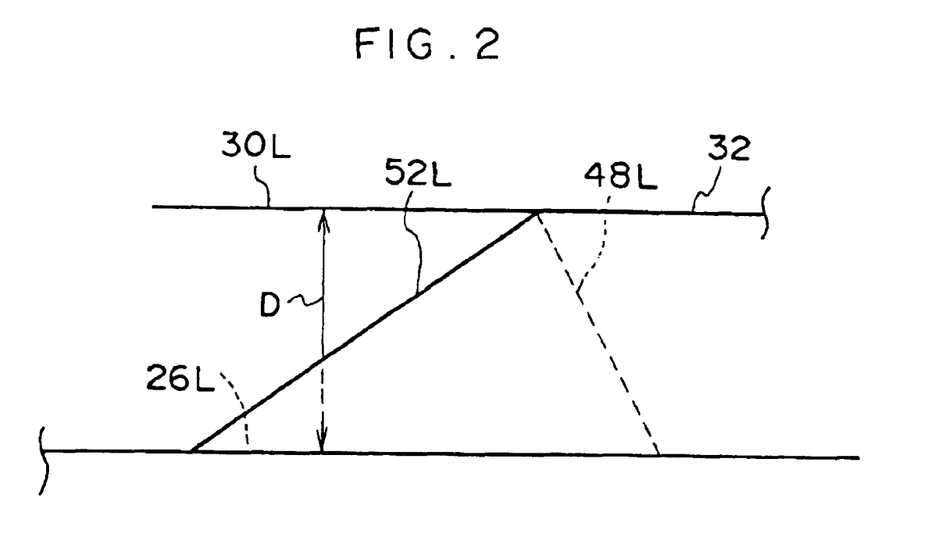
FIG. 2 is a side view of a center block and a second block as seen from a circumferential direction of the tire.
Figure 3:
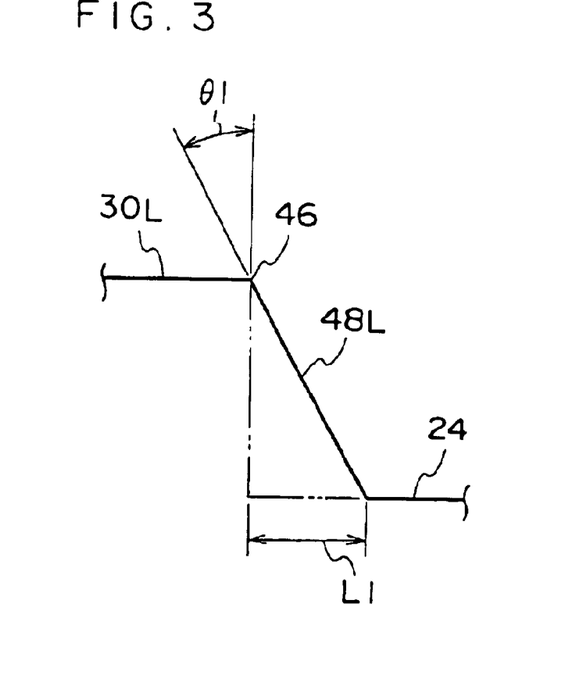
FIG. 3 is a cross-sectional view, along a tire rotational axis, of the second block (a cross-sectional view along line B—B of FIG. 1).

As shown in FIGS. 1 through 3, a reinforcing portion 48L (the portion enclosed by the two-dot chain line in FIG. 3), which is adjacent to the center block 32 as seen from the circumferential direction of the tire, is provided at the end portion of the second block 30L at the side of the equatorial plane CL (that is, a reinforcing portion 48L is provided at the "equatorial plane CL side" end portion of the second block 30L). A reinforcing portion 52L (the portion enclosed by the two-dot chain line in FIG. 3), which is adjacent to the second block 30L as seen from the circumferential direction of the tire, is provided at the end portion of the center block 32 at the left-hand side in FIG. 1 (that is, a reinforcing portion 52L is provided at the "widthwise direction left side" end portion of the center block 32). Similarly, a reinforcing portion 52R, which is adjacent to the second block 30R as seen from the circumferential direction of the tire, is provided at the end portion of the center block 32 at the right-hand side in FIG. 1 (that is, a reinforcing portion 52R is provided at the "widthwise direction right side" end portion of the center block 32). A reinforcing portion 48R, which is adjacent to the center block 32 as seen from the circumferential direction of the tire, is provided at the end portion of the second block 30R at the equatorial plane CL side (that is, a reinforcing portion 48R is provided at the "equatorial plane CL side" end portion of the second block 30R).

In the present embodiment, as seen from the circumferential direction of the tire, the reinforcing portion 48L of the second block 30L and the reinforcing portion 48R of the second block 30R are, along the entirety thereof, adjacent to the center block 32. The reinforcing portion 52L at the second block 30L side of the center block 32 is, along the entirety thereof, adjacent to the second block 30L. The reinforcing portion 52R at the second block 30R side of the center block 32 is, along the entirety thereof, adjacent to the second block 30R.

The reinforcing portion 48L of the second block 30L and the reinforcing portion 48R of the second block 30R are formed at portions at the sides of the tire equatorial plane CL from the starting lines of the reinforcing portions which are provided parallel to the tire equatorial plane CL.

As shown in FIG. 3, the reinforcing portion 48L has an inclined surface which is inclined at a constant angle $\theta 1$ with respect to a normal line rising at the tread surface in the present embodiment, such that the reinforcing portion 48L is angled downward toward the tire equatorial plane CL from the starting line 46 of the reinforcing portion 48L. (The same holds for the reinforcing portion 48R.)

The angle $\theta 1$ is within the range of 10 to 70°, and is preferably in the range of 15 to 65°. In the present embodiment, the angle $\theta 1$ is 27°.

Further, the groove depth D (see FIG. 2) of the transverse grooves 26L, 26R (and the other transverse grooves and circumferential grooves) in the present embodiment is 10.5 mm. The length L1 of the reinforcing portions 48L, 48R in the axial direction of the tire, is 5.5 mm.

Further, the groove width of the transverse grooves 24L, 24R and the transverse groove 28 is 7 mm (on average), and the groove width of the transverse grooves 26L, 26R is 2 mm (on average).

The reinforcing portions 52L, 52R of the center block 32 are formed, at outer side portions in the widthwise direction of the tire, from reinforcing portion starting lines 50 which are set to have the same distance, in the widthwise direction of the tire, from the tire equatorial plane CL as the starting lines 46 of the reinforcing portions so that uppermost edges of the reinforcing portions are substantially circumferentialy aligned.

Figure 4:
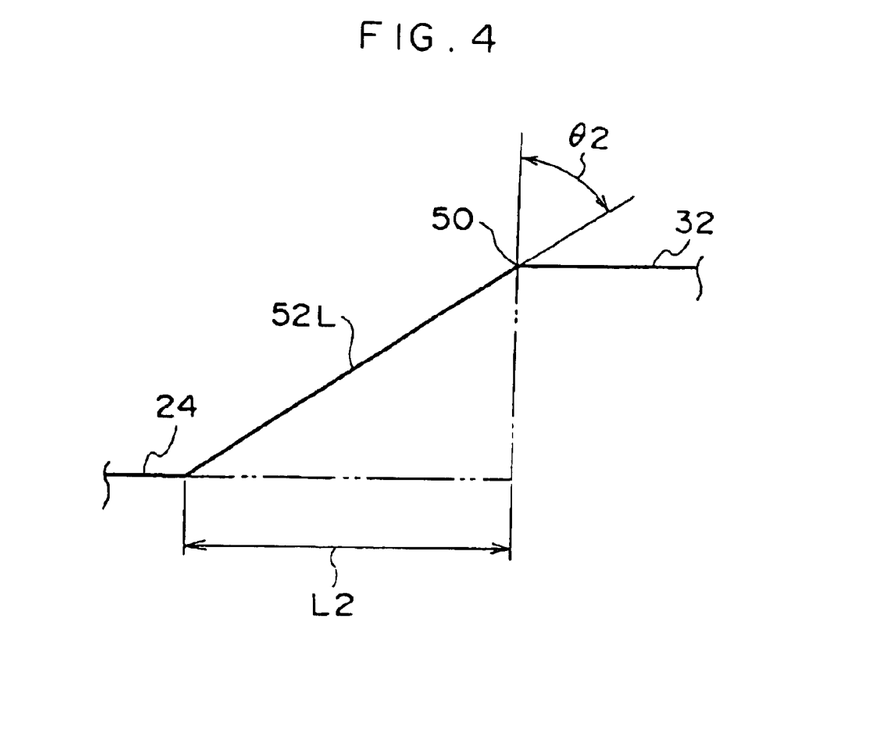
FIG. 4 is a cross-sectional view, along the tire rotational axis, of the center block (a cross-sectional view along line A—A of FIG. 1).

As shown in FIG. 4, the reinforcing portion 52L has an inclined surface which is inclined at a constant angle $\theta 2$ in the present embodiment, such that the reinforcing portion 52L is angled downward, toward the outer side in the widthwise direction of the tire, from the reinforcing portion starting line 50. (The same holds for the reinforcing portion 52R.)

In the same way as the angle $\theta 1$, the angle $\theta 2$ is within the range of 10 to 70°, and is preferably in the range of 15 to 65°. In the present embodiment, the angle $\theta 2$ is 56°. Further, the length L2, in the axial direction of the tire, of the reinforcing portions 52L, 52R of the present embodiment is 16 mm.

Note that the angle $\theta 1$ and the angle $\theta 2$ may be different or the same.

However, a planar inclined surface (chamfered configuration) is preferable as a configuration in which the height of the reinforcing portion decreases at a constant rate as the reinforcing portion is distanced from the block. Thus, it is preferable that the angle $\theta 1$ and the angle $\theta 2$ are constant at the respective inclined surfaces.

When the height of the reinforcing portion does not decrease at a constant rate, the amount of change in the properties at a specific wear rate could be great (or small). Thus, such a structure is not preferable.

Further, the transverse grooves 26L and the transverse grooves 26R, which are disposed at portions at which the reinforcing portions and the blocks face one another in the circumferential direction, are formed to be much more narrow than the transverse grooves 24L and the transverse grooves 24R which are at other positions. The groove width of the transverse groove 26L and the groove width of the transverse groove 26R are preferably in a range of 0.5 to 4 mm.

Namely, the negative ratio of the tread 12 of the present embodiment is 41%.

Further, in the present embodiment, the pitch number ratio of the blocks at the center tread region and the blocks at the both side tread regions is 2:3, but may be set in the range of 5:9 to 5:6.

The circumferential groove 14L of the present embodiment has, within one pitch in the circumferential direction of the shoulder block 18L, a wide portion and a narrow portion, such that a step portion (an edge factor extending in the tire widthwise direction) is provided at the boundary portion between the wide portion and the narrow portion.

Similarly, the circumferential groove 14R of the present embodiment has, within one pitch in the circumferential direction of the shoulder block 18R, a wide portion and a narrow portion, such that a step portion (an edge factor extending in the tire widthwise direction) is provided at the boundary portion between the wide portion and the narrow portion.

In the present embodiment, the circumferential groove 14L (precisely, the central line position thereof in the widthwise direction) is provided within a region of 10% of the ground contact width W, from the ground contact end at the left side, in the widthwise direction of the tire, (in the figure) of the tread 12 toward the tire equatorial plane CL. The circumferential groove 14R (precisely, the central line position thereof in the widthwise direction) is provided within a region of 40% of the ground contact width W, from the ground contact end at the right side, in the widthwise direction, (in the figure) of the tread 12 toward the tire equatorial plane CL. However, the positions, in the tire widthwise direction of the tire, of the circumferential groove 14L and the circumferential groove 14R are not limited to the aforementioned positions.

It is preferable that the circumferential groove 14L is provided within a region of 10 to 40% of the ground contact width W, from the ground contact end at the left side, in the widthwise direction of the tire, (in the figure) of the tread 12 toward the tire equatorial plane CL, and that the circumferential groove 14R is provided within a region of 10 to 40% of the ground contact width W, from the ground contact end at the right side (in the figure), in the widthwise direction of the tire, of the tread 12 toward the tire equatorial plane CL.

For example, when the circumferential grooves 14L, 14R are each provided in a region which is less than 10% of the ground contact width W from the ground contact end in the widthwise direction of the tread 12 toward the tire equatorial plane CL, the width of the shoulder block 18L is too small, and the block rigidity of the shoulder block 18L is insufficient. On the other hand, when the circumferential grooves 14L, 14R are provided within a region which is more than 40% of the ground contact width W from the ground contact ends in the widthwise direction of the tread 12 toward the tire equatorial plane CL, the width of the center block 32 is too small, and the rigidity of the center block 32 is insufficient.

(Operation)

Next, the operation of the pneumatic tire 10 relating to the present embodiment will be described.

(1) Because the circumferential groove 14L and the circumferential groove 14R are provided at the tread 12, the hydroplaning performance on wet road surfaces, performance on snow preventing the side slip, and the straight forward traveling stability and the like can be ensured.

(2) At least the center tread region is divided by the transverse grooves 26L, the transverse grooves 26R, the transverse grooves 28, the transverse grooves 26L and the transverse grooves 26R such that the plurality of blocks which are the center blocks 32, the second blocks 30L and the second blocks 30R are formed. Thus the basic properties required of a tire for a four wheel drive (traveling on rough roads, traveling on ice and snow, and the like) can be ensured.

(3) Because three block rows are provided in the center tread region, cornering performance at the time of traveling off-road and at the time of traveling on snow can be ensured.

Further, because the center blocks 32 are aligned on the tire equatorial plane CL, the on-road traveling performances (the feeling and sense of rigidity when traveling on-road) are improved.

(4) In the present embodiment, at the center tread region, when any of the blocks (e.g., the center block 32 (and especially the vicinities of the end portions of the center block 32 in the widthwise direction where the rigidity is relatively low)) attempts to deform in the circumferential direction of the tire, the reinforcing portion (e.g., the reinforcing portion 52L) provided at the block which is on the verge of being deformed suppresses such deformation of the block. Further, the block (e.g., the center block 32) which is on the verge of being deformed abuts against and is supported by the reinforcing portion (e.g., 48L) provided at the block (e.g., the second block 30L) adjacent thereto at the block deforming side. Thus, deformation of the block (e.g., the center block 32 (and especially the vicinities of the end portions of the center block 32, in the widthwise direction, where the rigidity is relatively low)) can effectively be suppressed.

Accordingly, in the center tread region, even though the number of transverse grooves is greater than in the conventional art, deformation of the center blocks 32, the second blocks 30L and the second blocks 30R is suppressed, and excellent on-snow performance is obtained.

(5) The heights of the reinforcing portions 48L, 48R and the reinforcing portions 52L, 52R decrease as the reinforcing portions are distanced from the block. Thus, when the blocks become worn due to traveling, the edge factor of the blocks gradually increases, and a deterioration in the on-snow performance and off-road performance, which deterioration accompanies a decrease in the groove volume of the circumferential grooves 14L, 14R, the transverse grooves 24L, 24R, the transverse grooves 26L, 26R, and the transverse groove 28 due to wear, is suppressed. Thus, there is little change in the performances from the time the tire is a new product until the final stages of wear.

(6) The respective blocks of the center tread region are reinforced by the reinforcing portions. Therefore, as compared with blocks at which no reinforcing portions are provided, the block rigidity at the time the tire is new is high, and the controlling stability on paved roads is improved.

(7) The heights of the reinforcing portions 48L, 48R and the reinforcing portions 52L, 52R decrease at a constant rate as the reinforcing portions are distanced from the block. Therefore, the block edge factor can be increased at a constant rate as the wearing of the block proceeds.

(8) Because the groove widths of the transverse grooves 26L, 26R are formed to be narrow (2 mm), at the center tread region, even if the amount of deformation of the block is small, the block reliably abuts the adjacent reinforcing portion such that the amount of deformation of the block can be kept small. Accordingly, when a great force is applied in the longitudinal direction of the tire at the time of braking or traction or the like, there is the effect of the blocks supporting each other, which contributes to an improvement in the rigidity of the tread 12.

(9) When the groove widths of the transverse grooves 26L, 26R exceed 4 mm, the reinforcing portions and the blocks are too far away from each other. The amount of deformation of the block is large, and the effect of providing the reinforcing portions is insufficient.

On the other hand, if the groove widths of the transverse grooves 26L, 26R are less than 0.5 mm, the water draining performance is poor, and the performances of the tire on wet road surfaces are poor.

(10) The angle $\theta 1$ of the inclined surfaces of the reinforcing portions 48L, 48R is 27°, and the angle $\theta 2$ of the inclined surfaces of the reinforcing portions 52L, 52R is 56°. Thus, the reinforcing effects by the reinforcing portions 48L, 48R and the reinforcing portions 52L, 52R can be reliably obtained while the reduction in the groove volume (of the transverse grooves) is kept to a minimum.

If the angles $\theta 1$, $\theta 2$ exceed 70°, the volume ratios of the reinforcing portions 48L, 48R and the reinforcing portions 52L, 52R with respect to the groove volumes is too large, and the disadvantage caused by the reduction in groove volume outweighs the advantage of the edge effect caused by having the reinforcing portions and the blocks face one another in the circumferential direction, which is not desirable from the standpoint of improvement of performances.

On the other hand, if the angles $\theta 1$, $\theta 2$ are less than 10°, the effect of having the reinforcing portions and the blocks face one another in the circumferential direction is slight, and hardly any improvement in block rigidity can be seen.

(11) The ratio of the numbers of blocks in the center tread region and the both side tread regions is set to be 2:3. The lengths, in the circumferential direction, of the center blocks 32 and the second blocks 30L, 30R at the center tread region are set to be longer than the lengths, in the circumferential direction, of the shoulder blocks 18L, 18R at the both side tread regions. Thus, even though the sipes 40, 44 are provided, the rigidity of the block in the center tread region required on on-road (dry and wet) road surfaces can be ensured.

(12) The ratio of the numbers of blocks in the center tread region and the both side tread regions is set to be 2:3. Thus, the circumferential direction dimensions of the shoulder blocks 18L, 18R at the both side tread regions can be set to be the same as or smaller than those in the conventional art. This relates to an improvement in pitch noise, and is also effective with respect to the comfort of ride and uneven wear resistance.

(13) A phase difference in the circumferential direction of the tire is provided between the blocks at the center tread region and the blocks at the both side tread regions of the center region. Thus, pattern noise can be improved. Further, because the number of blocks in the circumferential direction of the tire is different at the center tread region and at the both side tread regions, the effect of the phase offset is even greater.

(14) The angle, with respect to the circumferential direction of the tire, of the transverse grooves 16L, 16R at the both side tread regions is set to be greater than the angle, with respect to the circumferential direction of the tire, of the transverse grooves 24L, 24R and the transverse grooves 26L, 26R at the center tread region. Thus, the rigidity of the block ends (acute angle side portions) of the shoulder blocks 18L, 18R formed at the both side tread regions is ensured, and a deterioration in uneven wear resistance is prevented.

(15) The center blocks 32 have point-symmetrical configurations which are symmetrical around points on the tire equatorial plane CL. The second blocks 30L and the second blocks 30R have point-symmetrical configurations which are symmetrical to each other around points on the tire equatorial plane CL. Further, the shoulder block 18L and the shoulder block 18R have point-symmetrical configurations which are symmetrical to each other with the point of symmetry being one point on the tire equatorial plane CL. Thus, there are no restrictions on the direction of mounting the tire, and, for example, tire rotation for preventing uneven wear can be carried out easily.

(16) The second blocks 30L and the second blocks 30R are substantially triangular, and the configurations of the sides which oppose each other are formed as substantial arcs which are convex toward the tire equatorial plane CL. Thus, the volumes of the second blocks 30L and the volumes of the second blocks 30R can respectively be ensured, and the block rigidities of the second blocks 30L and the block rigidities of the second blocks 30R can be ensured.

(17) A phase difference in the circumferential direction of the tire is provided between adjacent blocks of the center blocks 32 at the center tread region, the second blocks 30L at the left side, and the second blocks 30R at the right side, which is effective with respect to pitch noise.

(18) Each of the center blocks 32, the second blocks 30L and the second blocks 30R formed at the center tread region are divided into three sub-blocks. Thus, the block rigidity in the center tread region, where rigidity is high due to the number of blocks being low (as compared to the both side tread regions), can be made to be appropriate, and a balance can be achieved between on-road properties and off-road properties.

(19) Because the pair of circumferential grooves 14 are formed by linear grooves which extend parallel to the circumferential direction of the tire, the water draining performance is excellent as compared to zigzag-shaped grooves, and there are advantages with respect to hydroplaning performance as well.

(20) The groove width of the circumferential groove 14L is made to be different within the pitch length, in the circumferential direction, of the shoulder block 18L such that a step portion is formed. Similarly, the groove width of the circumferential groove 14R is made to be different within the pitch length, in the circumferential direction, of the shoulder block 18R such that a step portion is formed. Thus, the direction edge factor in the axial direction of the tire increases, and the on-snow and off-road performances can be improved.

(Other Embodiments)

In the present invention, the number of circumferential grooves provided in the tread 12 is not limited to four as in the above-described embodiment, but it is preferable to provide a block row on the tire equatorial plane CL.

Further, the configurations of the respective blocks can be changed appropriately within a scope which does not deviate from the gist of the present invention.

In the above-described embodiment, the reinforcing portion starting line 46 of the second blocks 30 and the reinforcing portion starting line 50 of the center blocks 32 are disposed on a single straight line in the circumferential direction of the tire. However, the present invention is not limited to the same, and the reinforcing portion starting line 46 and the reinforcing portion starting line 50 may be slightly offset in the tire axial direction provided that the deformation of the blocks can be supported.

Experimental Examples

In order to confirm the effects of the pneumatic tire of the present invention, a pneumatic tire relating to a Comparative Example, and a pneumatic tire of an Example to which the present invention was applied were test manufactured, and experiments were carried out on the on-snow feeling (for the tires when new and when in intermediate stages of wear), the off-road feeling (for the tires when new and when in the final stages of wear), the paved road (dry) feeling, and the on-snow braking performance.

Example Tire: the tire of the above-described embodiment

Comparative Example Tire: a tire in which the reinforcing portions of the blocks were removed from the Example tire (i.e., the tread pattern of FIG. 5)

On-Snow Feeling: A test driver drove an actual vehicle on which the test tires were mounted, and carried out an overall evaluation (feeling evaluation) of the braking performance, starting forward performance, and cornering performance on a test course of a packed snow road surface. The evaluation was expressed as an index, with the index of the tire of the Comparative Example being 100. The higher the number, the better the performance.

Off-Road Feeling: An overall evaluation (feeling evaluation) of the braking performance, starting forward performance, straight forward traveling performance and cornering performance on a test course of a non-paved road was carried out. The evaluation was expressed as an index, with the index of the tire of the Comparative Example being 100. The higher the number, the better the performance.

Paved Road (Dry) Feeling: An overall evaluation (feeling evaluation) of the braking performance, starting forward performance, straight forward traveling performance and cornering performance on a test course of a paved road was carried out. The evaluation was expressed as an index, with the index of the tire of the Comparative Example being 100. The higher the number, the better the performance.

On-Snow Braking Performance: The braking distance at the time that a full-brake was applied from the state of the vehicle traveling at 40 km/h on packed snow was measured. The evaluation was expressed as an index, with the reciprocal of the braking distance of the tire of the Comparative Example being 100. The higher the number, the shorter the braking distance, and the better the on-snow braking performance.

TABLE 1

|  | Comparative example | example |
| --- | --- | --- |
| on-snow feeling (when tire was new) | 100 | 107 |
| on-snow feeling (at intermediate stage of wear) | 100 | 103 |
| off-road feeling (when tire was new) | 100 | 106 |
| off-road feeling (at final stage of wear) | 100 | 103 |
| feeling on paved road (dry) | 100 | 110 |
| on-snow braking performance | 100 | 105 |

From the results of the experiments, it can be understood that all of the performances of the tire of the Example to which the present invention was applied were improved over the tire of the Conventional Example.

As described above, the pneumatic tire based on the present invention exhibits excellent effects in particular with regard to the point that good off-road performances, on-snow performances, and on-road traveling performances can all be obtained.

What is claimed is:

1. A pneumatic tire comprising:
    a circumferential groove extending along a circumferential direction of the tire, and provided within a region which is 10 to 40% of a ground contact width from one ground contact end of a tread in the widthwise direction toward a tire equatorial plane;
    another circumferential groove extending along the circumferential direction of the tire, and provided within a region which is 10 to 40% of the ground contact width from another ground contact end of the tread in the widthwise direction toward the tire equatorial plane;
    at least two rows of blocks which, when a region between the pair of circumferential grooves is defined as a center tread region, are divided, in at least the center tread region, by a plurality of transverse grooves extending substantially in a tire axial direction;
    first reinforcing portions provided integrally with tire-widthwise-direction other side end portions of first blocks located at tire-widthwise-direction one side among the at least two rows of blocks, such that the first reinforcing portions are connected to block side surfaces of the first blocks and adjacent transverse groove bottom portions; and
    second reinforcing portions provided integrally with tire-widthwise-direction one side end portions of second blocks located at the tire-widthwise-direction other side which are adjacent to the first blocks, such that the second reinforcing portions are connected to block side surfaces of the second blocks and adjacent transverse groove bottom portions, wherein:
    at least a portion of each first reinforcing portion faces the second block with the transverse groove therebetween in the circumferential direction of the tire and overlaps the second block in the tire widthwise direction;
    at least a portion of each second reinforcing portion faces the first block with the transverse groove therebetween in the circumferential direction of the tire and overlaps the first block in the tire widthwise direction;
    a height of the first reinforcing portion decreases as the first reinforcing portion is distanced from the first block, and a height of the second reinforcing portion decreases as the second reinforcing portion is distanced from the second block, and
    the first reinforcing portion and the second reinforcing portion are alternatingly disposed in a circumferential direction, and are formed from reinforcing portion starting lines at the tread surface that are circumferentially aligned with each other.

2. A pneumatic tire according to claim 1, wherein all portions of the first reinforcing portion face the second block with the transverse groove therebetween in the circumferential direction of the tire and overlap the second block in the tire widthwise direction, and all portions of the second reinforcing portion face the first block with the transverse groove therebetween in the circumferential direction of the tire and overlap the first block in the tire widthwise direction.

3. A pneumatic tire according to claim 1, wherein the height of the first reinforcing portion decreases at a constant rate as the first reinforcing portion is distanced from the first block, and the height of the second reinforcing portion decreases at a constant rate as the second reinforcing portion is distanced from the second block.

4. A pneumatic tire according to claim 1, wherein a width of the transverse groove between the first reinforcing portion and the second block and a width of the transverse groove between the second reinforcing portion and the first block are formed to be narrower than widths of other transverse grooves.

5. A pneumatic tire according to claim 4, wherein a groove width of the transverse groove between the first reinforcing portion and the second block and a groove width of the transverse groove between the second reinforcing portion and the first block are set within a range of 0.5 to 4 mm.

6. A pneumatic tire according to claim 1, wherein the first reinforcing portion has an inclined surface whose angle, with respect to a line normal to a tread surface of the first block, is set within a range of 10 to 70°, and the second reinforcing portion has an inclined surface whose angle, with respect to a line normal to a tread surface of the second block, is set within a range of 10 to 70°.

7. A pneumatic tire according to claim 1, further comprising center blocks provided at the center of the tread in the widthwise direction thereof and left and right second blocks provided at outer sides of the center blocks in the widthwise direction of the tire, the center blocks and the left and right second blocks being provided in three rows at the center tread region,
    wherein a reinforcing portion provided at an end portion of each second block at the side of tire equatorial plane in the widthwise direction faces the center block with the transverse groove therebetween in the circumferential direction of the tire and overlaps the center block in the tire widthwise direction,
    and a reinforcing portion provided at each portion of the center block at the outer side of the center block in the widthwise direction faces the second block with the transverse groove therebetween in the circumferential direction of the tire and overlaps the second block in the tire widthwise direction.

8. A pneumatic tire according to claim 7, wherein widths of the transverse grooves between the reinforcing portions of the second blocks and the center blocks, and widths of the transverse grooves between the reinforcing portions of the center blocks and the second blocks are formed to be narrower than widths of other transverse grooves.

9. A pneumatic tire according to claim 8, wherein groove widths of the transverse grooves between the reinforcing portions of the second blocks and the center blocks, and groove widths of the transverse grooves between the reinforcing portions of the center blocks and the second blocks are set within a range of 0.5 to 4 mm.

10. A pneumatic tire according to claim 7, wherein the reinforcing portion of the second block has an inclined surface whose angle, with respect to a line normal to a tread surface of the second block, is set within a range of 10 to 70°, and the reinforcing portion of the center block has an inclined surface whose angle, with respect to a line normal to a tread surface of the center block, is set within a range of 10 to 70°.

11. A pneumatic tire comprising:
    a circumferential groove extending along a circumferential direction of the tire, and provided within a region which is 10 to 40% of a ground contact width from one ground contact end of a tread in the widthwise direction toward a tire equatorial plane;
    another circumferential groove extending along the circumferential direction of the tire, and provided within a region which is 10 to 40% of the ground contact width from another ground contact end of the tread in the widthwise direction toward the tire equatorial plane;

inclined in a first direction with respect to the circumferential direction;

center blocks provided at the center of the tread in the widthwise direction thereof and left and right second blocks provided at outer sides of the center blocks in the widthwise direction of the tire, the center blocks and the left and right second blocks being provided in three rows at a center tread region when a region between the pair of circumferential grooves is defined as the center tread region;

a reinforcing portion provided at an end portion of each second block, at the side of the equatorial plane in the widthwise direction of the tire; and a reinforcing portion provided at each end portion of the center block, at the outer side in the widthwise direction of the tire, wherein:

the reinforcing portion of the second block faces the center block with a transverse groove therebetween in the circumferential direction of the tire and overlaps the center block in the tire widthwise direction, and the reinforcing portion of the center block faces the second block with a transverse groove therebetween in the circumferential direction of the tire and overlaps the second block in the tire widthwise direction, wherein:

a height of the reinforcing portion of the second block decreases as the reinforcing portion is distanced from the second block, and a height of the reinforcing portion of the center block decreases as the reinforcing portion is distanced from the center block;

the reinforcing portion of the second block and the reinforcing portion of the center block are alternatingly disposed in a circumferential direction; and an uppermost edge of the reinforcing portion of the second block and an uppermost edge the transverse groove is inclined with respect to the circumferential direction in a second direction opposite the first directions, wherein a height of the reinforcing portion of the second block decreases as the reinforcing portion is distanced from the second block, and a height of the reinforcing portion of the center block decreases as the reinforcing portion is distanced from the center block, and wherein the reinforcing portion of the second block and the reinforcing portion of the center block are alternatingly disposed in a circumferential direction, and are formed from reinforcing portion starting lines at the tread surface that are circumferentially aligned with each other.

12. A pneumatic tire according to claim 11, wherein all portions of the reinforcing portion of the second block face the center block with the transverse groove therebetween in the circumferential direction of the tire and overlap the center block in the tire widthwise direction, and all portions of the reinforcing portion of the center block face the second block with the transverse groove therebetween in the circumferential direction of the tire and overlap the second block in the tire widthwise direction.

13. A pneumatic tire according to claim 11, wherein a height of the reinforcing portion of the second block decreases at a constant rate as the reinforcing portion is distanced from the second block, and a height of the reinforcing portion of the center block decreases at a constant rate as the reinforcing portion is distanced from the center block.

14. A pneumatic tire according to claim 11, wherein a width of the transverse groove between the reinforcing portion of the second block and the center block and a width of the transverse groove between the reinforcing portion of the center block and the second block are formed to be narrower than widths of other transverse grooves.

15. A pneumatic tire according to claim 14, wherein a groove width of the transverse groove between the reinforcing portion of the second block and the center block and a groove width of the transverse groove between the reinforcing portion of the center block and the second block are set within a range of 0.5 to 4 mm.

16. A pneumatic tire according to claim 11, wherein the reinforcing portion of the second block has an inclined surface whose angle, with respect to a line normal to a tread surface of the second block, is set within a range of 10 to 70°, and the reinforcing portion of the center block has an inclined surface whose angle, with respect to a line normal to a tread surface of the center block, is set within a range of 10 to 70°.

17. A pneumatic tire according to claim 1, wherein the second blocks are offset from the equatorial plane.

18. A pneumatic tire according to claim 1, further comprising shoulder blocks arranged on an outer side of one of the circumferential grooves in the widthwise direction, said shoulder blocks being defined by outer grooves inclined in a first direction with respect to the circumferential direction, wherein the transverse grooves are inclined with respect to the circumferential direction in a second direction opposite the first direction.

19. A pneumatic tire comprising:

a circumferential groove extending along a circumferential direction of the tire, and provided within a region which is 10 to 40% of a ground contact width from one ground contact end of a tread in the widthwise direction toward a tire equatorial plane;

another circumferential groove extending along the circumferential direction of the tire, and provided within a region which is 10 to 40% of the ground contact width from another ground contact end of the tread in the widthwise direction toward the tire equatorial plane;

at least two rows of blocks which, when a region between the pair of circumferential grooves is defined as a center tread region, are divided, in at least the center tread region, by a plurality of transverse grooves extending substantially in a tire axial direction;

first reinforcing portions provided integrally with tire-widthwise-direction other side end portions of first blocks located at tire-widthwise-direction one side among the at least two rows of blocks, such that the first reinforcing portions are connected to block side surfaces of the first blocks and adjacent transverse groove bottom portions; and second reinforcing portions provided integrally with tire-widthwise-direction one side end portions of second blocks located at the tire-widthwise-direction other side which are adjacent to the first blocks, such that the second reinforcing portions are connected to block side surfaces of the second blocks and adjacent transverse groove bottom portions, wherein:

at least a portion of each first reinforcing portion faces the second block with the transverse groove therebetween in the circumferential direction of the tire and overlaps the second block in the tire widthwise direction;

at least a portion of each second reinforcing portion faces the first block with the transverse groove therebetween in the circumferential direction of the tire and overlaps the first block in the tire widthwise direction;

a height of the first reinforcing portion decreases as the first reinforcing portion is distanced from the first block, and a height of the second reinforcing portion decreases as the second reinforcing portion is distanced from the second block, and the first reinforcing portion and the second reinforcing portion are alternatingly disposed in a circumferential direction, and are formed from reinforcing portion starting lines at the tread surface that are substantially circumferentially aligned with each other.

20. A pneumatic tire comprising:

a circumferential groove extending along a circumferential direction of the tire, and provided within a region which is 10 to 40% of a ground contact width from one ground contact end of a tread in the widthwise direction toward a tire equatorial plane;

another circumferential groove extending along the circumferential direction of the tire, and provided within a region which is 10 to 40% of the ground contact width from another ground contact end of the tread in the widthwise direction toward the tire equatorial plane;

shoulder blocks arranged on an outer side of one of the circumferential grooves in the widthwise direction, said shoulder blocks being defined by outer grooves inclined in a first direction with respect to the circumferential direction;

center blocks provided at the center of the tread in the widthwise direction thereof and left and right second blocks provided at outer sides of the center blocks in the widthwise direction of the tire, the center blocks and the left and right second blocks being provided in three rows at a center tread region when a region between the pair of circumferential grooves is defined as the center tread region;

a reinforcing portion provided at an end portion of each second block, at the side of the equatorial plane in the widthwise direction of the tire; and a reinforcing portion provided at each end portion of the center block, at the outer side in the widthwise direction of the tire, wherein:

the reinforcing portion of the second block faces the center block with a transverse groove therebetween in the circumferential direction of the tire and overlaps the center block in the tire widthwise direction, the reinforcing portion of the center block faces the second block with a transverse groove therebetween in the circumferential direction of the tire and overlaps the second block in the tire widthwise direction; and the transverse groove is inclined with respect to the circumferential direction in a second direction opposite the first direction, wherein:

a height of the reinforcing portion of the second block decreases as the reinforcing portion is distanced from the second block, and a height of the reinforcing portion of the center block decreases as the reinforcing portion is distanced from the center block;

the reinforcing portion of the second block and the reinforcing portion of the center block are alternatingly disposed in a circumferential direction and are formed from reinforcing portion starting lines at the tread surface that are substantially circumferentially aligned with each other.

21. A pneumatic tire comprising:

a circumferential groove extending along a circumferential direction of the tire, and provided within a region which is 10 to 40% of a ground contact width from one ground contact end of a tread in the widthwise direction toward a tire equatorial plane;

another circumferential groove extending along the circumferential direction of the tire, and provided within a region which is 10 to 40% of the ground contact width from another ground contact end of the tread in the widthwise direction toward the tire equatorial plane;

shoulder blocks arranged on an outer side of one of the circumferential grooves in the widthwise direction, said shoulder blocks being defined by outer grooves inclined in a first direction with respect to the circumferential direction;

center blocks provided at the center of the tread in the widthwise direction thereof and left and right second blocks provided at outer sides of the center blocks in the widthwise direction of the tire, the center blocks and the left and right second blocks being provided in three rows at a center tread region when a region between the pair of circumferential grooves is defined as the center tread region;

a reinforcing portion provided at an end portion of each second block, at the side of the equatorial plane in the widthwise direction of the tire; and a reinforcing portion provided at each end portion of the center block, at the outer side in the widthwise direction of the tire, wherein:

the reinforcing portion of the second block faces the center block with a transverse groove therebetween in the circumferential direction of the tire and overlaps the center block in the tire widthwise direction, the reinforcing portion of the center block faces the second block with a transverse groove therebetween in the circumferential direction of the tire and overlaps the second block in the tire widthwise direction; and the transverse groove is inclined with respect to the circumferential direction in a second direction opposite the first direction, wherein:

a height of the reinforcing portion of the second block decreases as the reinforcing portion is distanced from the second block, and a height of the reinforcing portion of the center block decreases as the reinforcing portion is distanced from the center block;

the reinforcing portion of the second block and the reinforcing portion of the center block are alternatingly disposed in a circumferential direction; and an uppermost edge of the reinforcing portion of the second block and an uppermost edge of the reinforcing portion of the center block are substantially circumferentially aligned with each other.

22. A pneumatic tire comprising:

a circumferential groove extending along a circumferential direction of the tire, and provided within a region which is 10 to 40% of a ground contact width from one ground contact end of a tread in the widthwise direction toward a tire equatorial plane;

another circumferential groove extending along the circumferential direction of the tire, and provided within a region which is 10 to 40% of the ground contact width from another ground contact end of the tread in the widthwise direction toward the tire equatorial plane;

center blocks provided at the center of the tread in the widthwise direction thereof and left and right second blocks provided at outer sides of the center blocks in the widthwise direction of the tire, the center blocks and the left and right second blocks being provided in three rows at a center tread region when a region between the pair of circumferential grooves is defined as the center tread region;

a reinforcing portion provided at an end portion of each second block, at the side of the equatorial plane in the widthwise direction of the tire; and a reinforcing portion provided at each end portion of the center block, at the outer side in the widthwise direction of the tire, wherein:

the reinforcing portion of the second block faces the center block with a transverse groove therebetween in the circumferential direction of the tire and overlaps the center block in the tire widthwise direction; and the reinforcing portion of the center block faces the second block with a transverse groove therebetween in the circumferential direction of the tire and overlaps the second block in the tire widthwise direction, wherein:

a height of the reinforcing portion of the second block decreases as the reinforcing portion is distanced from the second block, and a height of the reinforcing portion of the center block decreases as the reinforcing portion is distanced from the center block;

the reinforcing portion of the second block and the reinforcing portion of the center block are alternatingly disposed in a circumferential direction and are formed from reinforcing portion starting lines at the tread surface that are substantially circumferentially aligned with each other.

* * * * *